(12) United States Patent
Yoon et al.

(10) Patent No.: US 8,256,846 B2
(45) Date of Patent: Sep. 4, 2012

(54) DIMPLES LIFTING PIPE FOR MINING DEEP-SEA MINERAL RESOURCES

(75) Inventors: Chi-Ho Yoon, Daejeon (KR);
Jong-Myung Park, Daejeon (KR);
Yong-Chan Park, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 446 days.

(21) Appl. No.: 12/429,710

(22) Filed: Apr. 24, 2009

(65) Prior Publication Data
US 2010/0180972 A1    Jul. 22, 2010

(30) Foreign Application Priority Data
Jan. 21, 2009 (KR) .................. 10-2009-0005241

(51) Int. Cl.
*E02F 3/92* (2006.01)
(52) U.S. Cl. .................................. 299/8; 114/243
(58) Field of Classification Search .......... 299/8; 428/141, 428/156; 138/39, 44; 114/243, 67, 288
See application file for complete search history.

(56) References Cited

U.S. PATENT DOCUMENTS

| | | | | |
|---|---|---|---|---|
| 4,232,903 A | * | 11/1980 | Welling et al. | 299/8 |
| 4,984,218 A | * | 1/1991 | Ritter et al. | 367/15 |
| 5,171,623 A | * | 12/1992 | Yee | 428/156 |
| 5,378,524 A | * | 1/1995 | Blood | 428/141 |
| 6,415,730 B1 | * | 7/2002 | Barker | 114/243 |

* cited by examiner

*Primary Examiner* — John Kreck
(74) *Attorney, Agent, or Firm* — Arent Fox LLP

(57) ABSTRACT

Disclosed herein is a lifting pipe which is used in a manganese nodule mining system including a collection device for collecting deep-sea manganese nodules and a lifting pump and which has a structure in which dimples are formed on the surface of the lifting pipe so as to reduce drag so that the lifting pipe is less influenced by flows of ocean current. The dimpled lifting pipe includes dimples that are formed on the outer circumferential surface of the dimpled lifting pipe, so that turbulent flows are generated, thereby reducing drag caused by ocean currents of a deep sea.

2 Claims, 8 Drawing Sheets

DIMPLES LIFTING PIPE FOR MINING DEEP-SEA MINERAL RESOURCES

CROSS-REFERENCE TO RELATED APPLICATION

This application claims the priority of Republic of Korea Application No. 10-2009-0005241, filed Jan. 21, 2009. The disclosure of the prior application is hereby incorporated herein in its entirety by reference.

BACKGROUND OF THE INVENTION

1. Field of the Invention

The present invention relates generally to a dimpled lifting pipe for mining deep-sea mineral resources, and, more particularly, to a lifting pipe which is used in a manganese nodule mining system including a collection device for collecting deep-sea manganese nodules and a lifting pump and which has a structure in which dimples are formed on the surface of the lifting pipe so as to reduce drag so that the lifting pipe is less influenced by flows of ocean current.

2. Description of the Related Art

Due to an increase in the global demand for mineral resources, marine mineral resources are attracting attention as new alternatives. Of these marine mineral resources, deep-sea manganese nodules have flat or spherical shapes, are blackish brown and are non-crystalline. They are soft when they are collected, and they are easy to break when they are dry.

Such manganese nodules are chiefly composed of manganese, iron, silicic acid and moisture. The quantities of ingredients vary depending on location. There are two theories for the formation of manganese nodules: the theory that manganese nodules were precipitated from colloidal hydroxides and the theory that manganese nodules were precipitated due to the catalytic reaction of ion oxide. Manganese nodules are present in the deep sea (4000~5000 m in depth), and grow about 0.01~1 mm every 1000 years.

As shown in FIG. 14, a system 10 for mining such deep-sea manganese nodules includes a collection device 12 to be disposed on the bottom of the deep sea, a lifting pipe, a lifting pump 14 system, a buffer, and a mining ship 16 to be located on the sea surface. Manganese nodules are separated and collected from the bottom of the deep sea by a collection device, the concentration of the flow of the manganese nodules is optimized in the buffer below the lifting pipe, that is, in an intermediate storage space, and then the manganese nodules are continuously transferred to the top of the sea through the lifting pipe.

However, prior art lifting pipes have lengths ranging from hundreds of meters to a thousand meters and have circular cross-sections. Accordingly, these prior art lifting pipes vibrate due to ocean currents of the deep sea and such vibrations make stable mining using collection devices and lifting pumps difficult due to the vibrations of the lifting pipes and cause technical difficulties to the entire lifting system. Accordingly, a reduction in drag upon these lifting pipes can be an important solution to the alleviation of the above problem.

SUMMARY OF THE INVENTION

Accordingly, the present invention has been made keeping in mind the above problems occurring in the prior art, and an object of the present invention is to provide a lifting pipe which is part of a system for mining deep-sea manganese nodules and which has dimples on the outer circumferential surface thereof, so that turbulent flows are generated, thereby reducing drag caused by ocean currents of the deep sea.

In order to accomplish the above object, the present invention provides a dimpled lifting pipe for mining deep-sea mineral resources, the dimpled lifting pipe being used in a manganese nodule mining system including a collection device for collecting deep-sea manganese nodules and a lifting pump, wherein dimples are formed on the outer circumferential surface of the dimpled lifting pipe, so that turbulent flows are generated, thereby reducing drag caused by ocean currents of the deep sea.

Preferably, the dimples are formed such that 12 dimples are arranged in each row on the circumferential surface of the lifting pipe of a specific size.

Preferably, the dimples are formed such that 12 dimples are arranged in each row at angular intervals of 30 degrees on the circumferential surface of the lifting pipe of a specific size.

Preferably, the dimples are formed such that 12 dimples are arranged in each row and dimples in any row and dimples in its neighboring row are alternately arranged.

Preferably, the dimples are formed such that 12 dimples are arranged in each row, dimples in any row and dimples in its neighboring row are alternately arranged, rows are spaced apart at intervals corresponding to a value obtained by multiplying the diameter of the dimples by 0.81, and the dimples are arranged by connecting the centers of two neighboring dimples in any row with an imaginary line and placing the center of a corresponding dimple in its neighboring row along a line extending upward or downward from the center of the line.

Preferably, the dimples are formed such that on the basis of a specific diameter of the lifting pipe, the diameter of the dimples has a value that is obtained by dividing a circumference of the lifting pipe by 24.

Preferably, the dimples are formed such that a drag coefficient is 0.9, which is less than the drag coefficient of a smooth cylinder, that is, 1, at Reynolds number=2000.

Preferably, the dimples are formed at a ratio at which the depth thereof is in the range of 0.15-0.35 cm when a diameter thereof is 1 cm.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
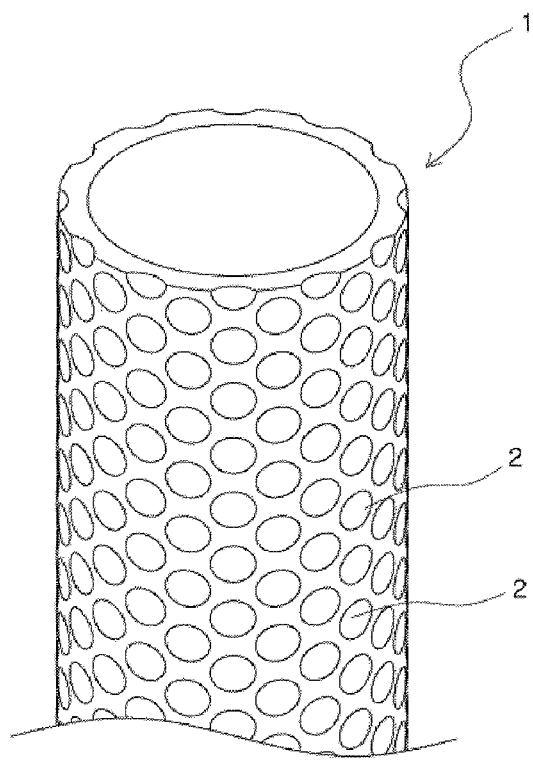
FIG. 1 is a perspective view showing a dimpled lifting pipe according to the present invention.

Reference now should be made to the drawings, in which the same reference numerals are used throughout the different drawings to designate the same or similar components.

The construction and operation of embodiments of the present invention will be described in detail below in conjunction with the accompanying drawings. Meanwhile, in the following description of the present invention, if detailed descriptions of well-known constructions and functions obscure the gist of the present invention, the detailed descriptions will be omitted.

Figure 2:
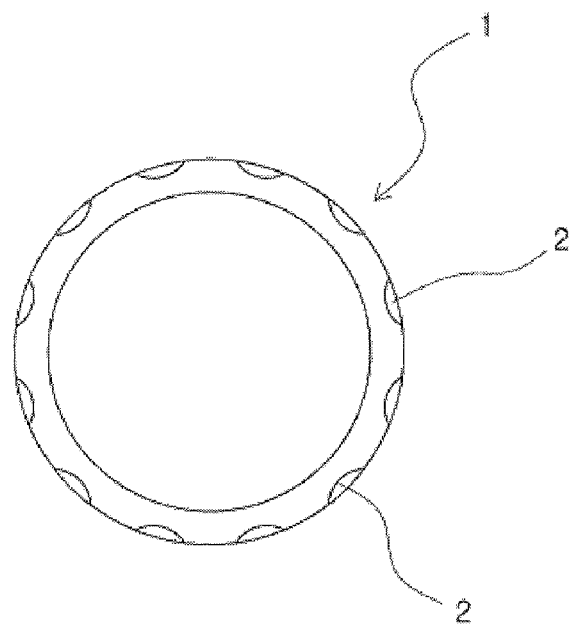
FIG. 2 is a plan view showing the dimpled lifting pipe according to the present invention.
Figure 3:
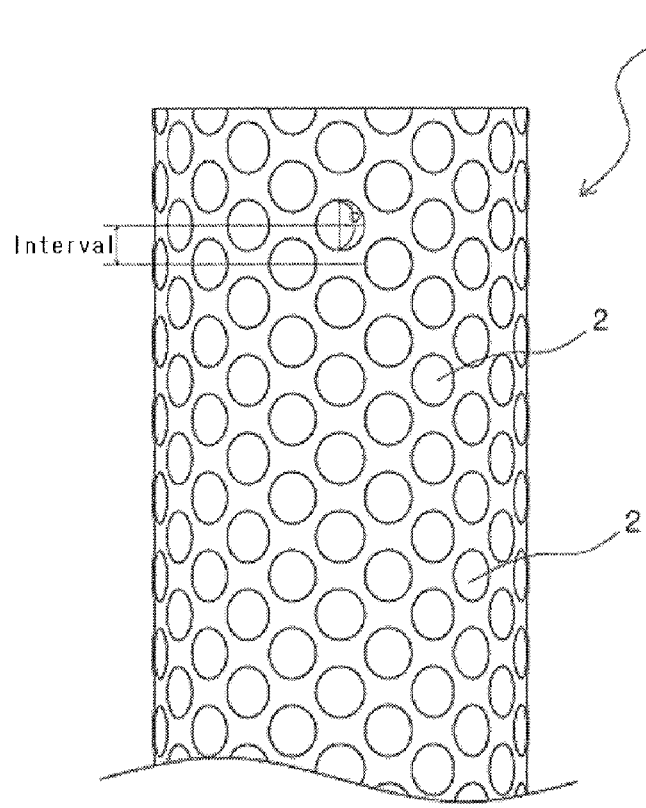
FIG. 3 is a plan view showing the dimpled lifting pipe according to the present invention.

FIG. 1 is a perspective view showing a dimpled lifting pipe 1 according to the present invention, FIG. 2 is a plan view showing the dimpled lifting pipe 1 according to the present invention, and FIG. 3 is a plan view showing the dimpled lifting pipe 1 according to the present invention.

As shown in these drawings, dimples 2 are successively arranged on the outer circumferential surface of the lifting pipe 1 according to the present invention. These dimples generate the effect of reducing drag in the primary flow direction of an ocean current. The reason for this is that turbulent flows are generated in dimples at angles of 60~90 degrees with respect to the primary flow and transport energy attributable to the turbulent flows increases, so that a separation point moves downstream, with the result that the influence of an ocean current acting upon the lifting pipe, that is, drag, is reduced, thereby reducing the vibration of the lifting pipe.

The diameter of the lifting pipe 1 may vary. It is preferable that about 12 dimples be formed on the outer circumferential surface of the lifting pipe having a varying diameter at angular intervals of 30° when viewed in a circular cross section.

In this case, the preferred conditions for the formation of dimples are as follows.

On the basis of the diameter of a specific lifting pipe, the diameter of the dimples is set to a value obtained by dividing the circumference of the lifting pipe 1 by 24. For example, in the case where the diameter is 10 cm, the circumference is 31.4 cm. When 31.4 cm is divided by 24, 1.31 cm is obtained. Accordingly, in the case where the diameter is 10 cm, 12 dimples with a diameter of 1.31 cm are formed in the circumferential direction of the lifting pipe. That is, when one dimple is eliminated from each couple of neighboring dimples in an arrangement composed of 24 dimples, dimples are disposed at angular intervals of 30 degrees and form a single row.

Furthermore, the conditions for the setting of the interval between the row formed under the above-described condition and neighboring rows placed above and below the former row will now be described. With regard to the interval between the upper and lower rows, another row of dimples, that is, 12 dimples, is formed at an interval corresponding to a value that is obtained by multiplying the diameter of the dimples by 0.81. In this case, the centers of two neighboring dimples in any row are connected with an imaginary line and the center of a corresponding dimple in its neighboring row is placed along a line extending upward or downward from the center of the line. Using this arrangement method, the dimples in the upper and lower rows are alternately arranged.

The reason for adopting the alternative arrangement is that the alternative arrangement can generate turbulent flows better than a rectangular arrangement. The reason why the 12 dimples are arranged at the intervals as described above is that it is difficult to achieve the effect of generating turbulent flows due to the excessive interference between dimples if the intervals become larger, and the effect of generating turbulent flows decreases if the intervals become smaller.

Furthermore, the condition for the setting of the depth of the dimples will now be described. The ratio of the depth of the dimples to the print diameter of the dimples is in the range of 0.15-0.35. That is, when the print diameter is 1 cm, surface depressions are formed such that the depth of the dimples is in the range of 0.15-0.35 cm. The reason why the depth of the dimples is limited within the range of 0.15-0.35 cm on the basis of a print diameter of the dimples of 1 cm is that a flow is blocked by the dimples if the depth is greater than the upper limit while an effect in which it seems as if there are no dimples is generated due to the generation of a smooth surface effect if the depth is less than the lower limit. That is, under the above-described conditions, turbulent flows are generated. When the turbulent flows are generated, a transition point is formed at a back position, thereby reducing drag.

The theory of reducing drag according to the present invention will be described in detail with reference to a preferred embodiment.

Embodiment

In the following embodiment, FLUENT version 6.3.26 and GAMBIT 2.3.16, which are numerical analysis codes, were used as the numerical analysis methods.

Furthermore, since turbulent flow modeling provides a more improved ability to solve the problem of a complex flow on a channel surface than that of the basic k-ε model, a realizable k-ε model was used as a turbulent flow model. These Reynolds-averaged Navier-Stokes equations were solved numerically in conjunction with transport equations for the turbulent kinetic energy and dissipation rate. Continuity was satisfied using a semi-implicit method for pressure-related equations, which was called the SIMPLE procedure. To reduce numerical errors, second-order spatial discretization schemes were employed.

Furthermore, each computational iteration was solved implicitly. The convergence of the computational solution was determined based on scaled residuals, which were set to 10-3. The total number of computational iterations for the convergence was in the range of about 200~400.

The results of the numerical analysis were divided into three embodiments and then analyzed. In Embodiment 1, a flow structure established when dimples were formed on one surface of a rectangular duct was analyzed. In Embodiment 2, a flow around two-dimensional circular cylinder was analyzed. In Embodiment 3, a flow around a two-dimensional circular cylinder with dimples was analyzed.

Embodiment 1

Figure 4:
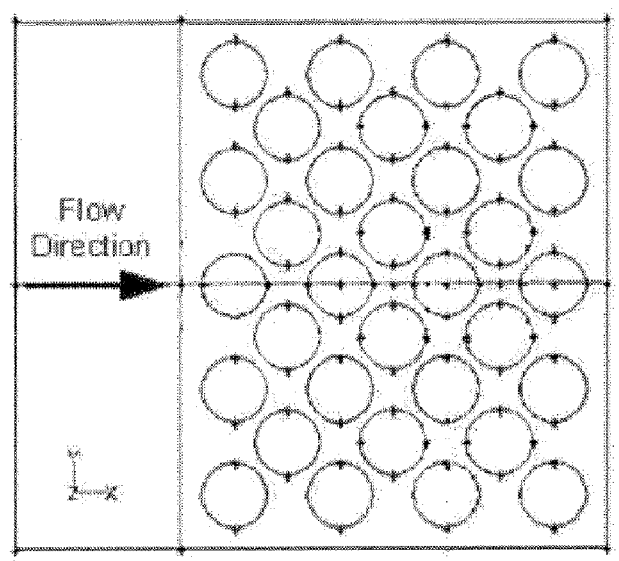
FIG. 4 is a schematic diagram showing a flow structure within a rectangular duct on one surface of which are formed dimples according to an embodiment of the present invention.

Flow Structure within a Rectangular Duct on One Surface of which Dimples are Formed FIG. 4 is a schematic diagram showing a flow structure within a rectangular duct on one surface of which dimples are formed. On the dimpled surface, dimples are arranged in seven columns in an alternating fashion. The height within the rectangular duct and the print diameter of the dimples are all 0.0508 m, and the depth of the dimples is 0.01524 m. The ratio of the depth of the dimples to the print diameter of the dimples is 0.3, and the hydraulic diameter of the duct is 0.0942 m. A smooth, non-dimpled duct is placed upstream of the dimpled surface duct, and is 1.2 m in length.

Figure 5:
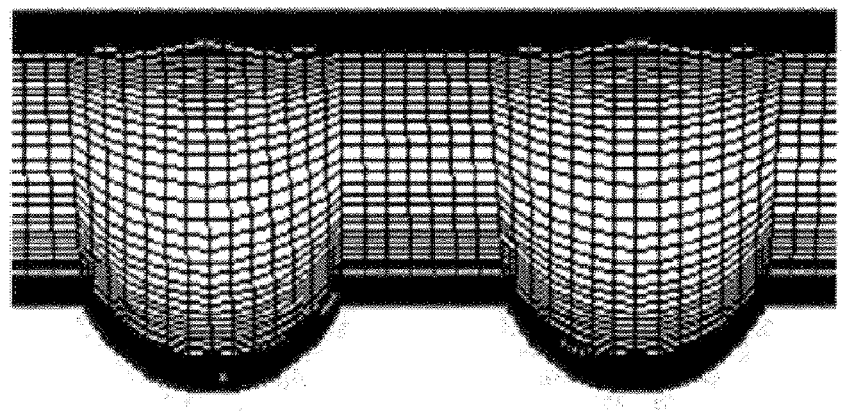
FIG. 5 is a diagram showing an example of the computational grid of a surface taken in the flow direction according to Embodiment 1 of the present invention.

The inlet velocity of air is 4.43 m/s, and the intensity of a turbulent flow is 0.5%. The energy equation was not taken into consideration, and the computational grid of a surface taken in the flow direction is shown in FIG. 5. The computational results were improved by concentrating the grids on the wall surface and the dimpled surface, and the wall function was not used.

Figure 6:
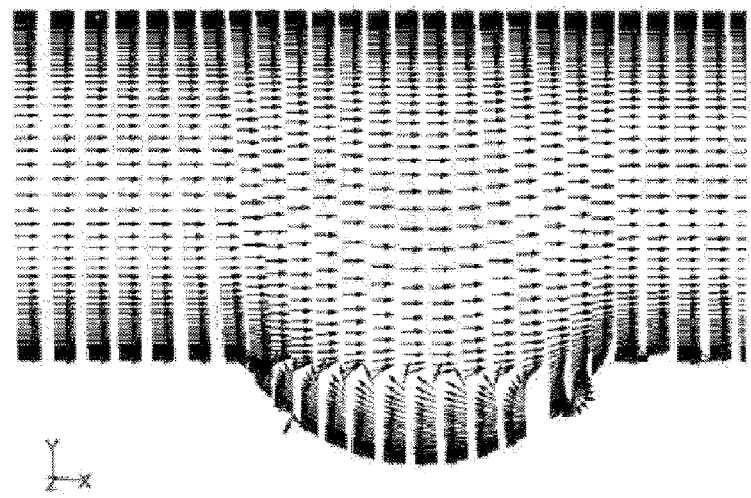
FIG. 6 shows a sectional view of an example of velocity vectors taken in the flow direction according to Embodiment 1 of the present invention.

FIG. 6 shows a sectional view of a velocity vector taken in the flow direction. A fluid flows from the left side to the right side. The flow in a dimple includes a recirculation region, and the attachment of the fluid occurs near the area downstream of the dimple.

Figure 7:
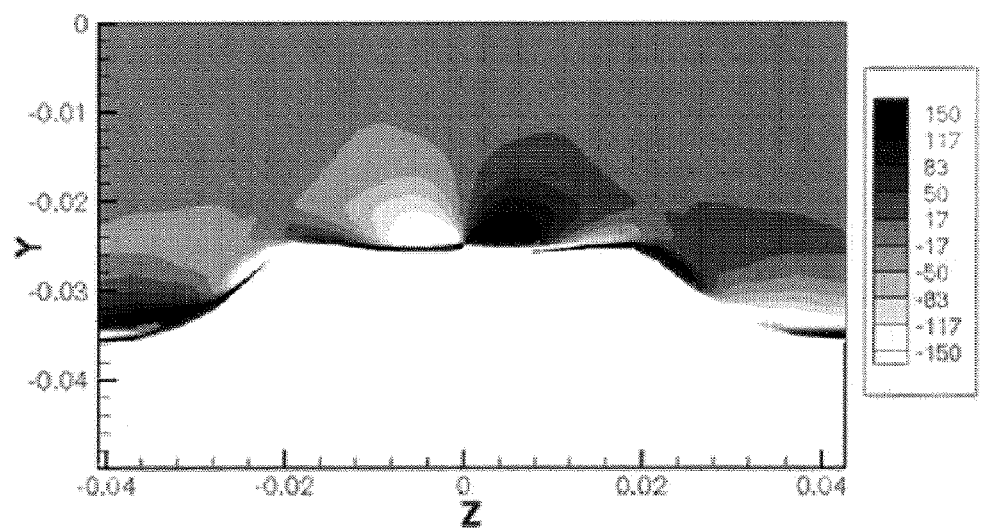
FIG. 7 is a diagram showing an example of a voracity distribution in the flow direction according to Embodiment 1 of the present invention.

FIG. 7 represents a voracity distribution in the flow direction in a plane perpendicular to the flow direction at a position immediately after the last dimple of a fifth column. A primary vortex structure is distinct at a position immediately after the last dimple, while a plurality of secondary vortex structures is distinct inside dimples. The primary vortex A starts approximately at the reattachment location of each dimple and is developed outside the dimple. A fluid flowing into each dimple flows from the dimple in such a vortex form in order to satisfy a continuity equation. This dimple arrangement produces a large number of vortices, thereby increasing three-dimensional turbulent transport.

Figure 8:
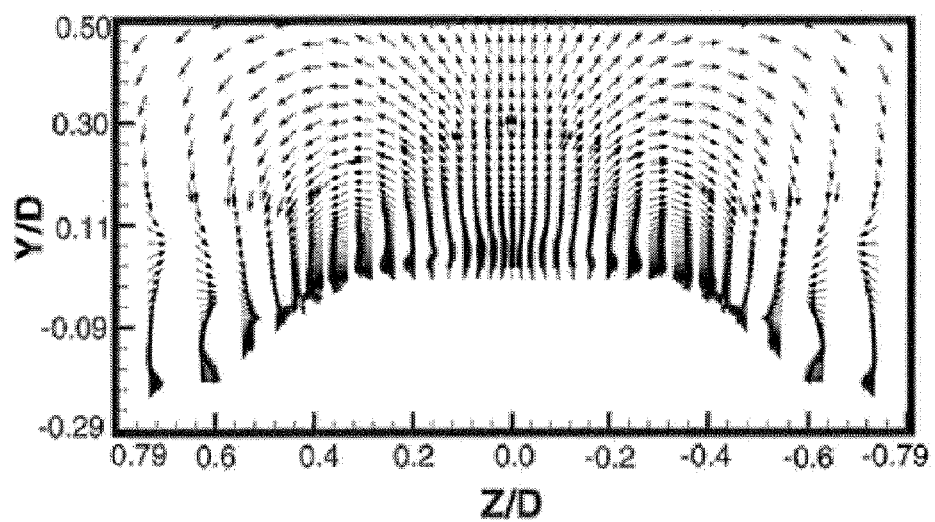
FIG. 8 is a diagram showing an example of velocity vectors in a plane identical to that shown in FIG. 7 according to Embodiment 1 of the present invention.

FIG. 8 shows velocity vectors in a plane identical to that shown in FIG. 7. As shown in this drawing, the presence of a primary vortex is distinct and a rising flow is present due to the primary vortex.

Embodiment 2

Two-Dimensional Flow Around a Circular Cylinder

Figure 9:
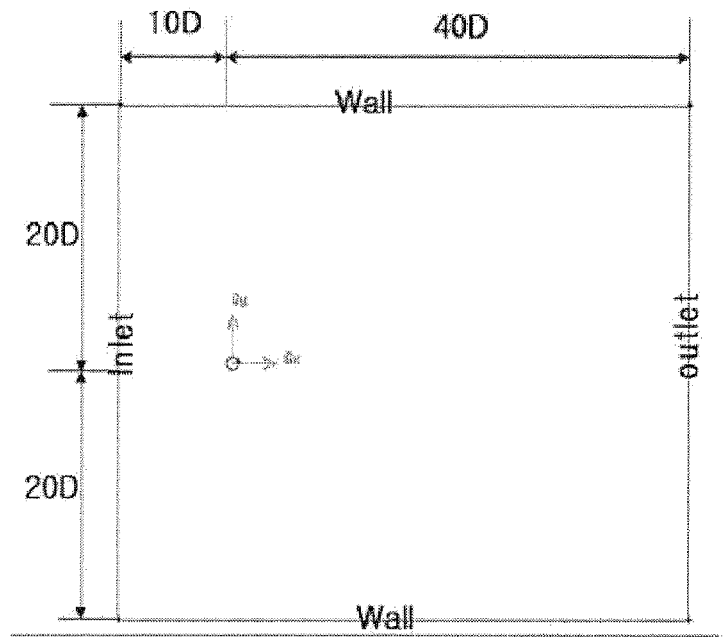
FIG. 9 is a schematic diagram of a two-dimensional circular cylinder according to Embodiment 2 of the present invention.

FIG. 9 is a schematic diagram of a two-dimensional circular cylinder. The length of the inlet thereof is 40 times the diameter of the cylinder. The cylinder is a circle at the center of this drawing, and a flow field around the cylinder is present within a square domain. The inlet velocity is uniform. For Re=150, a laminar flow was analyzed. Water with a constant viscosity value and a constant density value was selected as a working fluid.

Figure 10:
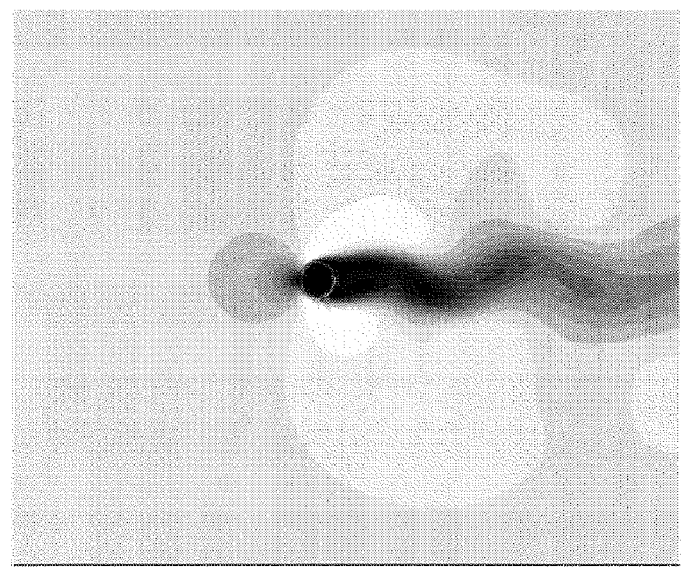
FIG. 10 is a diagram showing an example of the results of a flow field around a cylinder at time=7670 sec. according to Embodiment 2 of the present invention.

FIG. 10 shows results of a flow field around the cylinder at time=7670 sec. and Re=150. A fluid flow generated a von Karman vortex street while passing around the cylinder. This vortex street was subjected to the periodic generation, growth and destruction thereof in the wake behind the cylinder.

The drag coefficient is defined as follows:

$$C_D = \frac{F_D}{\frac{1}{2}\rho u_0^2 A} \quad (1)$$

where $\rho$ is the density of water and $u_0$ is the velocity of the water at the inlet. A is the area of the projected cylinder, and $F_D$ is drag acting upon the cylinder. According to White's work in 1986, the drag coefficient is about 1.3 at Re=150. The value output by the simulation was 1.26, which is proximate to 1.3.

Embodiment 3

Analysis of a Flow Field of a Two-Dimensional Cylinder

In this embodiment, two-dimensional circular dimples are formed on the outer surface of a cylinder identical to that used in Embodiment 2. The Reynolds number is 2000, and this range corresponds to a laminar flow region. A total of 12 dimples are formed on the outer wall of the cylinder, and each of the dimples forms an angle of 30 degrees with a neighboring dimple. The ratio of the depth of the dimples to the print diameter of the dimples is in the range of 0.15-0.35.

Figure 11:
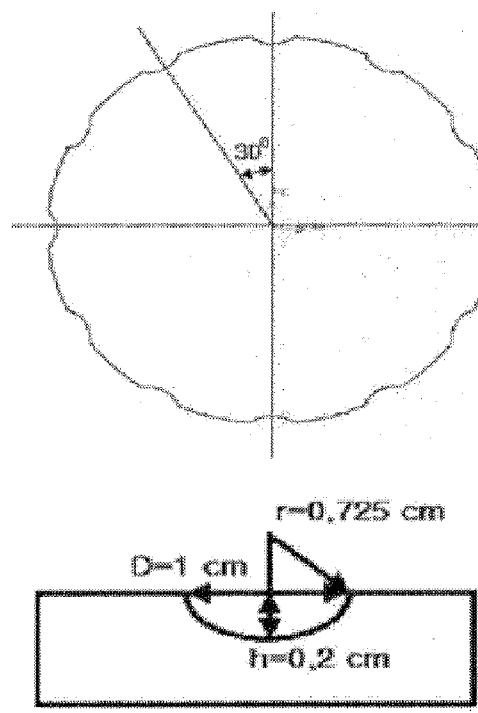
FIG. 11 is a schematic diagram of a lifting pipe with dimples according to Embodiment 3 of the present invention.

FIG. 11 is a schematic diagram of a lifting pipe with dimples. The shape of the dimples is illustrated in this drawing. In this drawing, the print diameter of the dimples is 1 cm, and the depth of the dimples is in the range of 0.15-0.35 cm. A flow flows from the left side of this drawing to the right side thereof. In the foregoing description, the reason why the depth of the dimples is limited within the range of 0.15-0.35 cm on the basis of a print diameter of the dimples of 1 cm is that a flow is blocked by the dimples if the depth is greater than the upper limit while an effect in which it seems as if there are no dimples is generated due to the generation of a smooth surface effect if the depth is less than the lower limit. That is, under the above-described conditions, turbulent flows are generated. When the turbulent flows are generated, a transition point is formed at a back position, thereby reducing drag.

Figure 12:
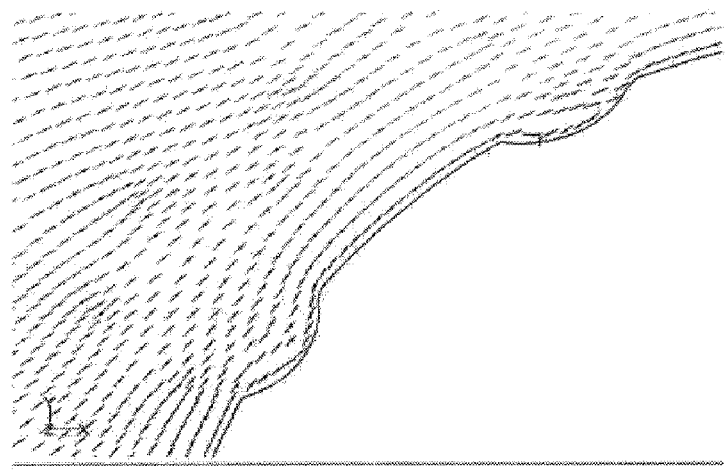
FIG. 12 is a diagram showing an example of the results of performing numerical analysis on dimples that belong to 12 dimples and form angles of 30 and 60 degrees with the flow direction at Re=2000 according to Embodiment 3 of the present invention.

FIG. 12 shows the results of numerical analysis in dimples that belong to 12 dimples and form 30 degrees and 60 degrees with the flow direction at Re=2000. A backward flow phenomenon is not present in dimples located at an angle of 30 degrees, while a backward velocity vector is present in dimples located at an angle of 60 degrees.

Figure 13:
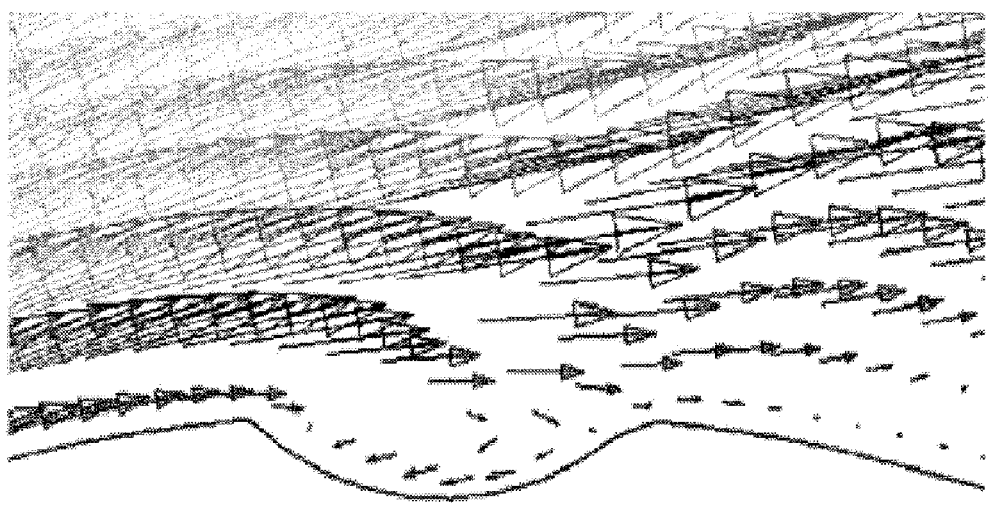
FIG. 13 is a diagram showing the results of performing numerical analysis on dimples that belong to 12 dimples and form an angle of 90 degrees with the flow direction at Re=2000 according to Embodiment 3 of the present invention.
Figure 14:
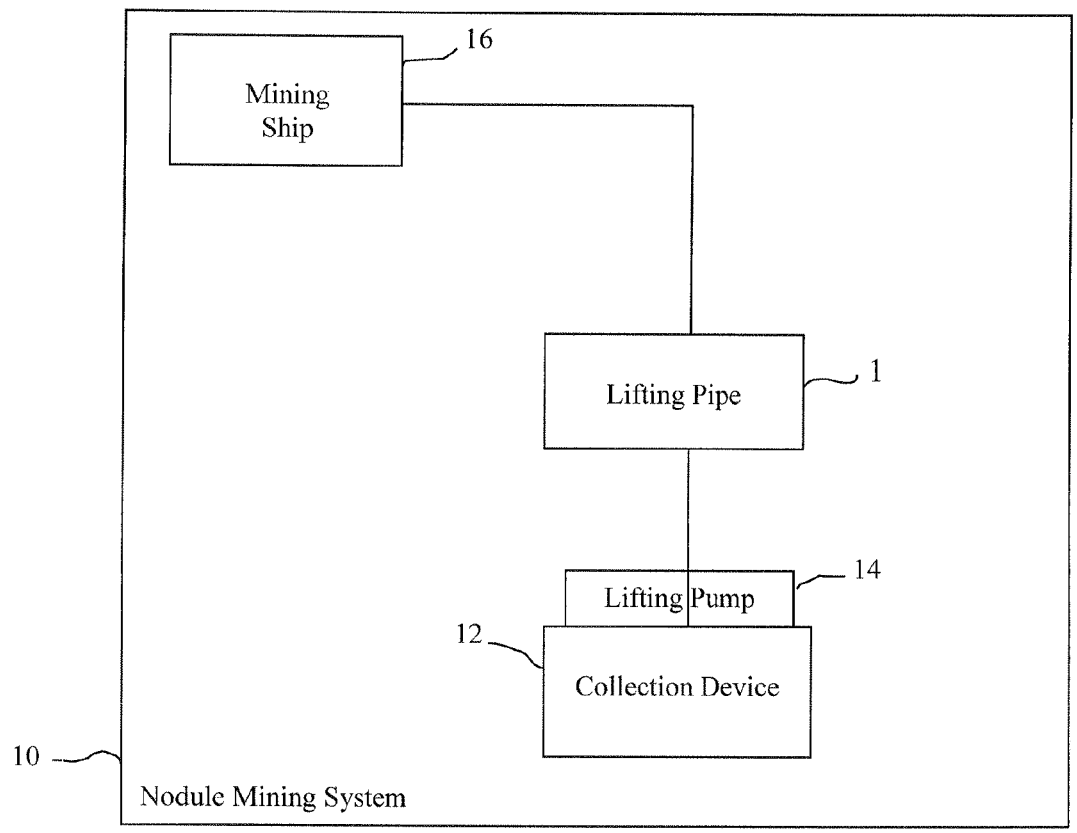
FIG. 14 is a schematic diagram showing a nodule mining system.

FIG. 13 shows the results of numerical analysis in dimples that belong to 12 dimples and form an angle of 90 degrees with the flow direction at Re=2000. A backward flow is distinct in each dimple, and this flow is related to the primary vortex and the plurality of secondary vortices, as shown in the flow phenomenon within a duct with one dimpled surface. These vortices generate the effect of further moving the separation point downstream by increasing transport energy attributable to the turbulent flow. As a result, the drag coefficient of the lifting pipe with dimples is about 0.9, which is a value less than 1.0 in White's work in 1986.

As described above, the flow around the circular lifting pipe with external dimples was analyzed using FLUENT. In order to analyze the flow in dimples, three embodiments were examined. In Embodiment 1, the flow in the rectangular duct with dimples was analyzed. In Embodiment 2, a velocity distribution around a two-dimensional circular cylinder was analyzed. In Embodiment 3, the flow around a circular lifting pipe with dimples was analyzed, and the results of this analysis were compared with the analysis results of Embodiment 2.

1. The results of Embodiment 1 show the presence of a recirculation region in a dimple, which was caused by vortices. An alternate dimple arrangement generates and develops various types of vortices, which increase the intensity of local three-dimensional turbulent transport.

2. Embodiment 2 indicates that the results of the numerical analysis are squarely consistent with experimental results.

3. Embodiment 3 shows the presence of recirculation regions in dimples that are present in the outer wall of the circular lifting pipe. In particular, recirculation regions are present in dimples at angles of 60 degrees and 90 degrees, while recirculation regions are indistinct in dimples at an angle of 30 degrees. It can be seen that these recirculation regions increase the magnitude of turbulent transport, which generates an increase in momentum, thus resulting in causing the separation point of a boundary layer to move downstream.

According to the present invention, dimples are formed on the circumferential surface of a lifting pipe constituting part of a system for mining deep-sea manganese nodules, so that the turbulent flow is generated, and thus the vibration of the lifting pipe is reduced due to a reduction in drag attributable to ocean currents of the deep sea, with the result that the overall system connected to the lifting pipe can stably perform mining, thereby providing an advantage of considerably improving the efficiency of the mining of manganese nodules. Accordingly, the present invention is an invention that is useful and expected to be widely used in the industry.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A dimpled lifting pipe for mining deep-sea mineral resources, the dimpled lifting pipe being used in a manganese nodule mining system including a collection device for collecting deep-sea manganese nodules and a lifting pump,
   wherein dimples are formed on an outer circumferential surface of the dimpled lifting pipe, so that turbulent flows are generated, thereby reducing drag caused by ocean currents of a deep sea,
   wherein the dimples are formed such that 12 dimples are arranged in a plurality of rows and arranged in each row at angular intervals of 30 degrees on the circumferential surface of the lifting pipe of a specific size,
   wherein the dimples are formed such that on a basis of a specific diameter of the lifting pipe, a diameter of the dimples has a value that is obtained by dividing a circumference of the lifting pipe by 24,
   wherein the dimples are formed such that a drag coefficient is 0.9, which is less than a drag coefficient of a smooth cylinder, that is, 1, at Reynolds number=2000, and
   wherein the dimples are formed at a ratio at which a depth thereof is in a range of 0.15-0.35 cm when a diameter thereof is 1 cm.

2. The dimpled lifting pipe as set forth in claim 1, wherein the dimples are formed on more than half of the surface area of the dimpled lifting pipe.

* * * * *